Feb. 20, 1951   J. JOZÍF ET AL   2,542,926
MOTORCYCLE FRONT FORK WITH HEADLIGHT
Filed Sept. 14, 1946

Inventors:
Josef Jozíf
Jiří Mráz
by Singer, Ehlert, Stern &
Carlberg, Attorneys.

Patented Feb. 20, 1951

2,542,926

UNITED STATES PATENT OFFICE 2,542,926

MOTORCYCLE FRONT FORK WITH HEADLIGHT

Josef Jozíf and Jiří Mráz, Prague, Czechoslovakia

Application September 14, 1946, Serial No. 697,102 In Germany December 24, 1943

2 Claims. (Cl. 280—289)

The present invention relates to an arrangement of the front fork with headlight in motor cycles or similar automotive vehicles, more particularly to such an arrangement of the fork and headlight cover in mutual connection whereby a body is formed having a substantially smooth and undivided surface without any projecting unshielded portions.

The main feature of such an arrangement consists in obtaining a preferable aerodynamic shape presenting a minimum air resistance. Another feature is the possibility of easy cleaning of the surface. A further feature consists in the fact that the individual elements are perfectly protected against the penetration of rainwater and dust.

According to the present invention there is no necessity, for obtaining the aerodynamic shape of the fork, by arranging special shield plates surrounding the headlight or projecting portions of the fork, because the headlight proper with its jacket forms the cover of the entire front top portion of the fork above the lower cross member connecting both fork prongs with the lower end of the steering column. Moreover, in such arrangement the fork head connecting the fork with the top end of the steering column is divided, outside the headlight jacket, in two parts so as to enable the fork to be removed as a whole from the frame, the mutual connection of said parts being, within small limits, adjustable in a direction parallel to the steering axis thus permitting of adjusting the proper play in the bearing of the steering column. The mutual connection of both parts of the fork head is preferably realized through the medium of grooves parallel with the steering column and secured by screws.

An embodiment of the object of the present invention is illustrated, by way of example, in the accompanying drawing wherein Fig. 1 shows the top part of the fork partially in section and partially in side view.

Figure 1:
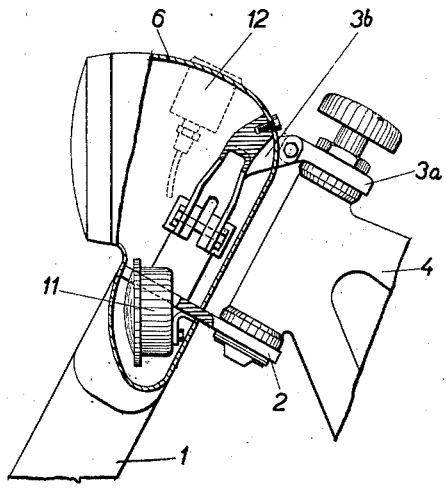
Figure 2:
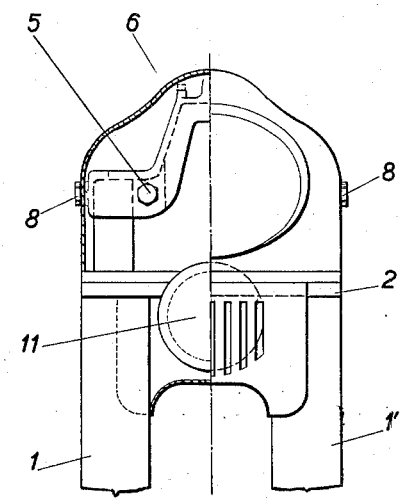
Fig. 2 shows a front view of the fork, the left half showing the headlight jacket in section, the right half the same in elevation view.

In these drawings 1 and 1' indicate both lateral members of the fork, said members forming together with the lower cross member 2 and the head 3a, 3b a rigid whole with the steering column supported within the head of the frame 4. The fork head is divided into two portions, the portion 3a being bolted onto the top end of the steering column whilst the portion 3b is attached to both top ends of the side members of the fork.

The attachment of the member 3b to the side members is accomplished by lengthwise slotted sleeves which are slid on the top end of the side members and which are secured to the member 3b by screws 5.

Figure 3:
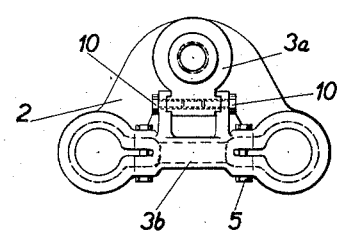
Fig. 3 shows a top view of the arrangement, the headlight jacket being omitted.

The headlight jacket is so arranged as to shield entirely both top ends of the side members 1, 1' and to extend down to the lower cross member 2. After fitting on, the headlight jacket 6 is held in place by screws 8. The mutual connection of both portions 3a, 3b is illustrated in Fig. 3 both portions being fitted into each other and provided with tongue and slot connections which after being set in the correct position are secured by bolts 10.

Figure 4:
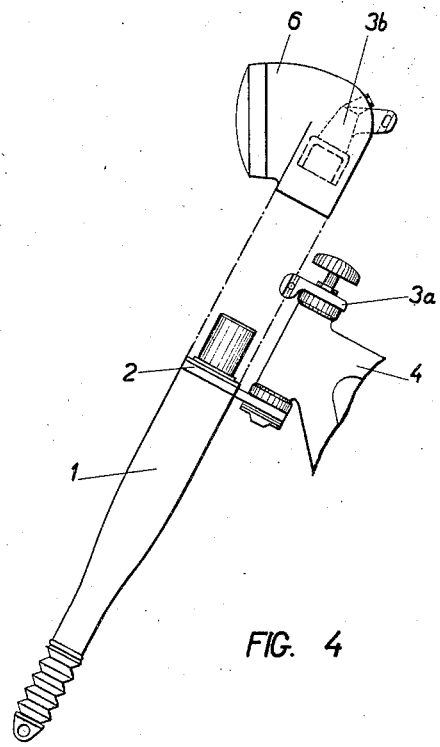
Fig. 4 shows, for the sake of illustrating the assembly of the parts, the fork in a side view with the headlight jacket shown separately above the fork.

When assembling, the portion 3b is first inserted into the headlight jacket 6, see Fig. 4, whereupon the jacket 6 is slid onto the fork in such manner that both slit sleeves of the portion 3b engage the top ends of the side members and the respective grooves of portion 3b receive the tongues on portion 3a. Thereupon, by tightening the screws 5 the portion 3b is fixedly connected to the top ends of the side members 1, 1' and by inserting the bolts 10 both portions of the fork head 3a and 3b are firmly connected together.

A feature of the division of the fork head in two portions 3a and 3b in the above described manner consists in the fact that the headlight jacket can be entirely closed, that furthermore manufacturing differences in the length of the steering axis and of the prong extremities are excluded and that the completely assembled fork can easily be mounted on, or removed from the machine as a unit.

Fig. 1 shows also the arrangement of the horn 11 and of the speedometer 12 in the headlight jacket 6.

What we claim is:

1. In combination with the front fork of a motor cycle or similar vehicle, a headlight, a headlight jacket enclosing the entire top portion of the fork, a cross member below the lower end of said jacket and connecting the two side members of the fork with the lower end of the steering column of the vehicle, the top of the fork consisting of two portions, one portion being substantially entirely enclosed by the headlight jacket and the other portion being fastened to the upper end of the steering column, said one portion having portions thereof protruding from said jacket and adjustably connected to said other portion to provide for adjustment of said one portion and said other portion in a direction parallel to the axis of said steering column.

2. In combination with the front fork of a motor cycle or similar vehicle, a headlight, a headlight jacket enclosing the entire top portion of the fork, a cross member below the lower end of said jacket and connecting the two side members of the fork with the lower end of the steering column of the vehicle, the top of the fork consisting of two portions, one portion being substantially entirely enclosed by the headlight jacket but having parts protruding therefrom, said parts being connected outside the headlight jacket with the other portion of the top of the fork, said other portion being fastened to the upper end of the steering column, the mutual junction of said portions being adjustable in a direction parallel to the axis of said steering column, and being accomplished through the medium of tongues and grooves extending in parallel direction to the steering axis and bolts securing said portions together in the desired position.

JOSEF JOZÍF.
JIŘÍ MRÁZ.

REFERENCES CITED

The following references are of record in the file of this patent:

UNITED STATES PATENTS

| Number | Name | Date |
|---|---|---|
| 1,995,795 | Clark | Mar. 26, 1935 |